UNITED STATES PATENT OFFICE.

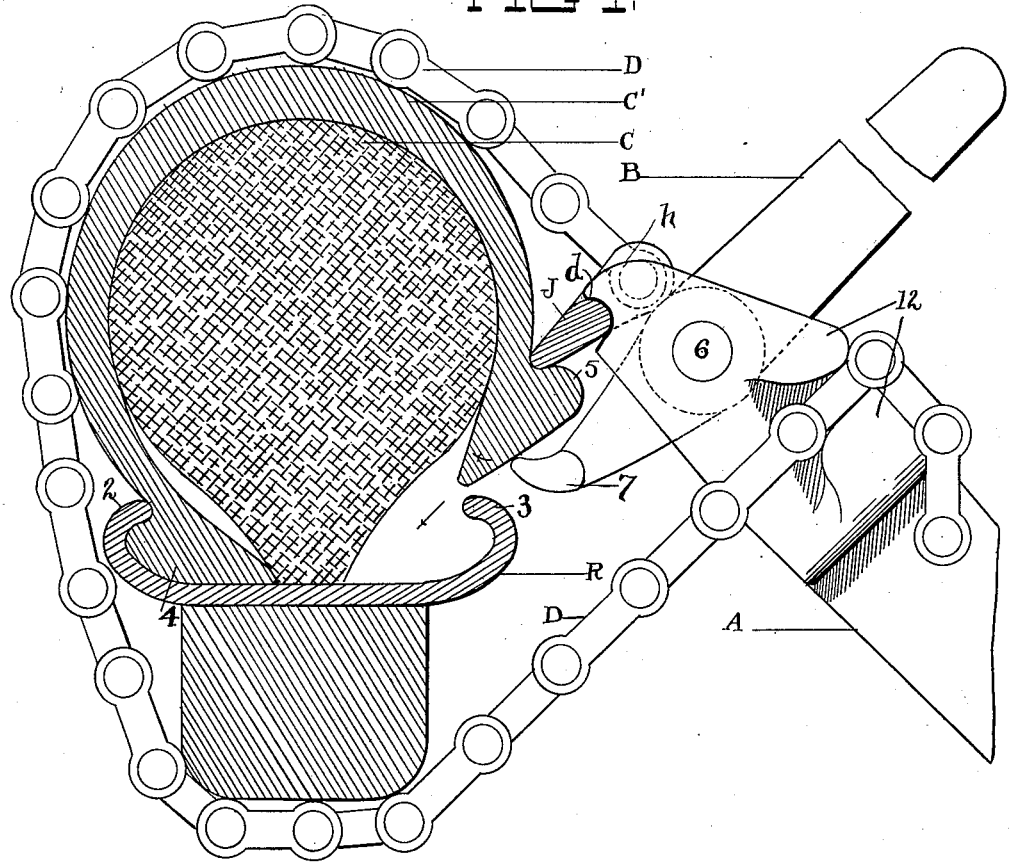

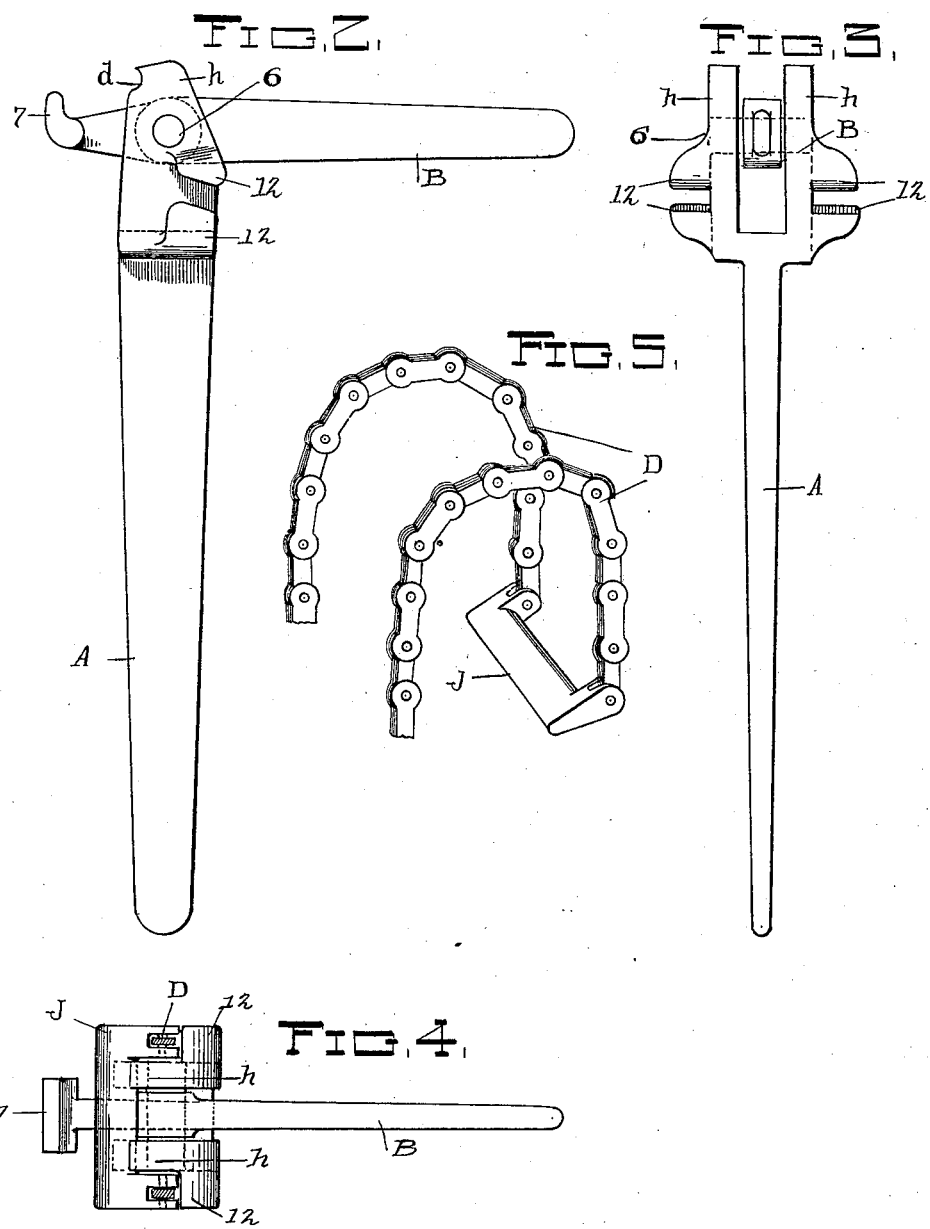

JAMES L. BUTLER, OF AKRON, OHIO, ASSIGNOR TO THE AMERICAN TIRE & RUBBER COMPANY, OF AKRON, OHIO, A CORPORATION.

TIRE-TOOL.

1,007,640.   Specification of Letters Patent.   Patented Oct. 31, 1911.

Application filed April 3, 1911. Serial No. 618,677.

*To all whom it may concern:*

Be it known that I, JAMES L. BUTLER, a citizen of the United States, residing at Akron, in the county of Summit and State of Ohio, have invented certain new and useful Improvements in Tire-Tools, of which the following is a specification.

This invention relates to a tire attaching and compressing tool in contradistinction to the usual tools for replacing the tire casing over pneumatic tubes.

In the accompanying drawings, Figure 1 is a cross section of a wheel tire, rim and felly with the parts of the tire partially mounted and a side elevation of the tool and means for forcing said parts into working position on the tire rim. Fig. 2 is a side elevation and Fig. 3 a view from the right thereof on a reduced scale of the tool alone; Fig. 4 is a perspective view of the chain portion of the device. Fig. 5 is a plan view of Fig. 2, with the jaw in place.

The invention herein is designed for especial use with a tire of my own invention and which comprises a compressible tire core C adapted to be used as a substitute for the usual pneumatic tube and is inclosed by the usual outer casing C'. The rim R also is of a well known type with inwardly curved side edges or flanges 2 and 3 respectively to engage over the respective beads or enlargements 4 and 5 of the casing. The core C however is of an original construction which I have worked out for wheel tires generally and which is fully described and claimed in a companion application, Ser. No. 618,676. It suffices therefore to say here that the said core is an embodiment of a homogeneous material or materials capable of being more or less compressed and resilient, under compression, especially, but also of a springy or cushioning quality or character inherently. However, it is with the compression of the said core that we have to deal in this instance so as to place the casing thereon, and the tool shown is designed for this purpose along with the fastening of the casing beneath or within the flanges of the rim. Of course the said casing itself is the immediate medium whereby the compression of the core is effected as it envelops the same all around and applies the force exerted thereon through the tool as is obvious.

Now, referring to the tool as an article of manufacture, sale and use, the same consists of a main lever A and an auxiliary lever B pivotally mounted on said main lever at 6 near their working ends. Other parts are the chains D and the connecting piece J, referred to hereinafter as the jaw adapted to force the casing down into engagement with the rim R.

The operation by which the casing is fastened over the cover is progressive from a starting point anywhere about the tire, and having made engagement of the casing beneath the flange 3 of the rim at a given point the casing is held there while further engagement is made immediately next thereto as the tool is moved along and so on step by step until the casing is engaged beneath the rim all around and the core is incidentally compressed.

In detail the member A of the tool has a bifurcated head between the sides of which the lever B is pivoted, and on the outside of which at both sides there are lugs 12 with open slots between for engagement of the chains D as shown. The end projections of said head indicated by *h* have circular recesses *d* in their lower end portions serving as bearings for the jaw J, rounded on its back to rest in said bearings when the parts are assembled in working relation. Otherwise the said chains and jaw are separate from the said levers A and B except as they engage in lugs 12 for work.

The lever B has a projection or jaw 7 curved as seen in Fig. 1 and adapted to bear against the otherwise free edge portion of the casing and guide or force it inward behind flange 3 of the rim while the main lever is bearing down on jaw J and forcing the casing downward. In this operation the chains have first been engaged at one end within the lugs 12 and then brought around the rim and tire from within so as to get the jaw J around the outside and into position to be set beneath the extremity of the main lever into recesses *d*. Now; assuming that the chains have been taken up as much as needed the device is in position to do the work. This is accomplished by lifting up on main lever A and drawing back on lever B more or less, thus suiting both actions to both the compressing and guiding effects desired. As this proceeds the jaw J turns on its bearings *d* until it lies practically flat against the casing at last and the ends of the chain connected therewith change relation in like manner but the recesses *d* are deep enough to confine the jaw J however severe the pull or strain.

What I claim is:

1. A tool for compressing and attaching wheel tires comprising a main lever and an auxiliary lever pivoted thereon and having a guiding jaw, and chains adapted to be drawn about the tire and operatively engaged at their ends with the said main lever.

2. A tool as described comprising a main lever having a head with open slots at its sides and chains removably engaged in said slots and provided with a cross piece at the other end adapted to be operatively engaged by the extremity of said lever.

3. A tire attaching tool comprising a main and an auxiliary lever pivotally united, said main lever having a head with recesses in its extremity and opposite open slots in its sides, and two compressing chains having a jaw member connecting their ends and adapted to be engaged by said recesses.

4. A tool for placing tire casings on wheels comprising a main lever having a head and two chains operatively connected therewith, and a jaw to engage the bead on the tire in working engagement with the head of said lever.

5. A tool to attach a tire casing on a rim over a compressible core comprising a main lever and a guide lever pivoted thereon and adapted to direct the beaded edge of the tire casing to locked position on the rim, said main lever having a head with lateral projections at its sides and curved recesses in its end, in combination with a jaw adapted to be operatively engaged in said recesses and flexible members fixed on said jaw and adapted to be locked in said lateral projection on the head.

6. A tire attaching tool consisting of a main lever and a guide lever for the edge of the tire pivoted therein, in combination with a separate jaw and flexible members connected with the ends thereof and adapted to engage about the tire, said main lever having a seat for said jaw and constructed at its sides to temporarily secure said flexible members thereon.

In testimony whereof I affix my signature in presence of two witnesses.

JAMES L. BUTLER.

Witnesses:
E. M. FISHER,
R. B. MOSER.

---

Copies of this patent may be obtained for five cents each, by addressing the "Commissioner of Patents, Washington, D. C."